United States Patent [19]

Cohen

[11] Patent Number: 4,604,739

[45] Date of Patent: Aug. 5, 1986

[54] OPTICAL FOCUS DETECTION EMPLOYING ROTATED INTERFERENCE PATTERNS

[75] Inventor: Donald K. Cohen, Tucson, Ariz.

[73] Assignee: International Business Machines Corporation, Armonk, N.Y.

[21] Appl. No.: 600,863

[22] Filed: Apr. 16, 1984

[51] Int. Cl.$^4$ .............................................. G11B 7/09
[52] U.S. Cl. ...................................... 369/45; 369/46; 250/201
[58] Field of Search ................... 369/45, 44, 46, 111, 369/110, 109; 250/201; 354/406

[56] References Cited

U.S. PATENT DOCUMENTS

| | | | |
|---|---|---|---|
| 3,345,912 | 10/1967 | Lohmann | 350/6.4 |
| 4,195,909 | 4/1980 | Holle | 350/162.17 |
| 4,293,944 | 10/1981 | Izumita | 369/46 |
| 4,381,557 | 4/1983 | Jebens | 369/45 |
| 4,426,693 | 1/1984 | Satoh | 369/45 |
| 4,504,938 | 3/1985 | Tajima | 369/45 |
| 4,525,625 | 6/1985 | Abe | 369/45 |
| 4,542,492 | 9/1985 | Leterme | 369/46 |

FOREIGN PATENT DOCUMENTS 2029051 3/1980 United Kingdom ................ 369/46

OTHER PUBLICATIONS

"Interferometer for Measuring Power Distribution of Ophthalmic Lenses", by Wyant & Smith, Applied Optics, Jul. 1975, vol. 14, No. 7, pp. 1607-1612.

*Optical Shop Testing* by Malacara, ©1978 John Wiley & Sons, p. 105.

Primary Examiner—Alan Faber
Attorney, Agent, or Firm—H. F. Somermeyer

[57] ABSTRACT

In an optical data storage disk device, focus of the recording and sensing beam is detected by sensing lateral shear (rotational orientation of a light interference pattern) of a beam reflected from the optical data storage disk. An exemplary shear detector includes a quadrant sensor having four quadrants for sensing the rotation of the reflected beam's interference pattern. Electrical analysis circuits illustrate evaluation of the sensed rotated interference pattern.

10 Claims, 5 Drawing Figures

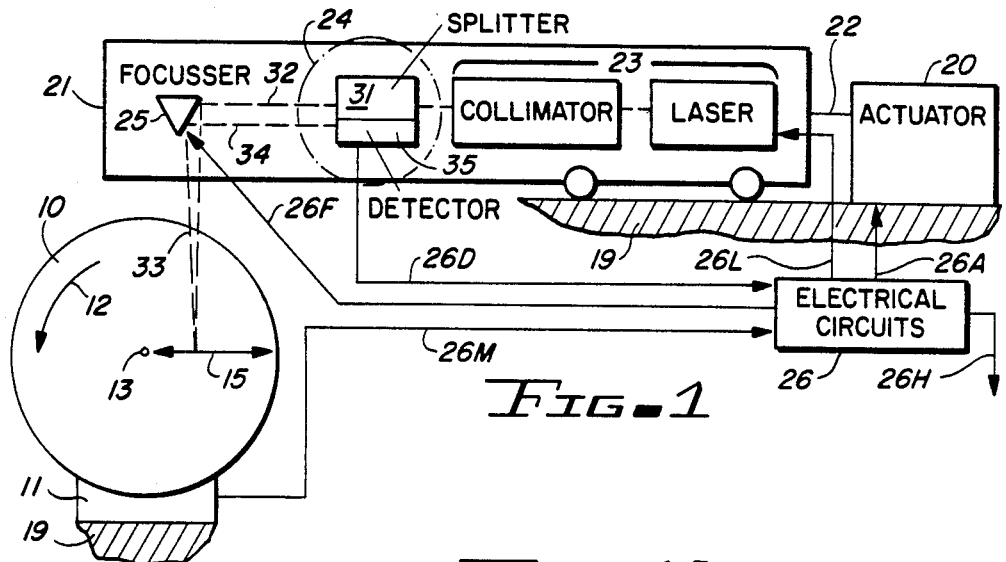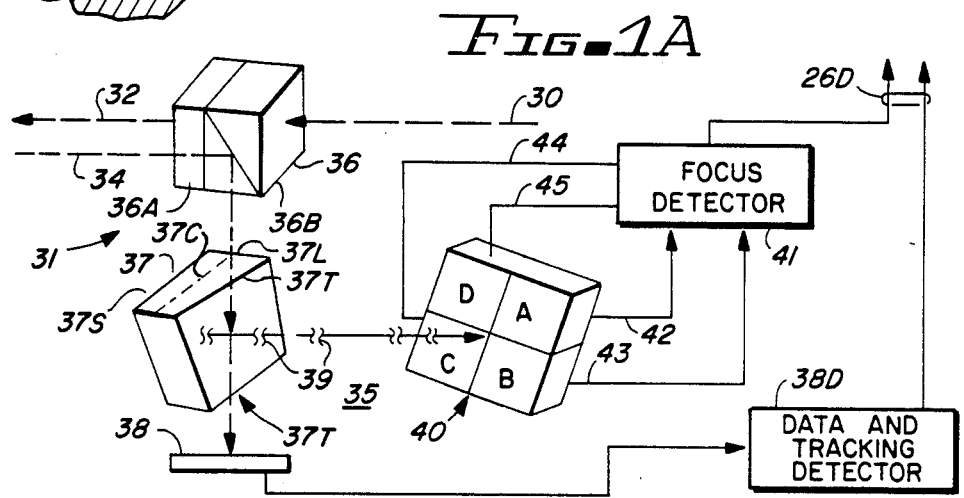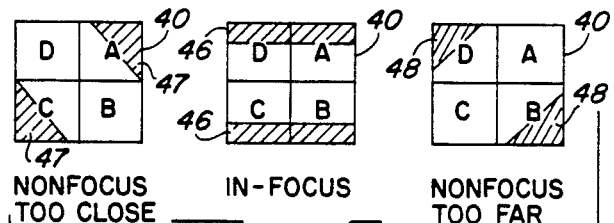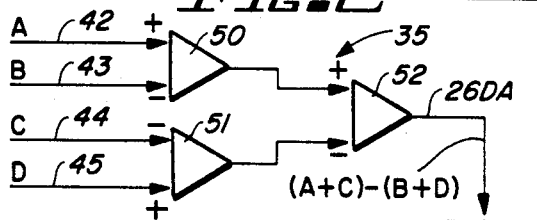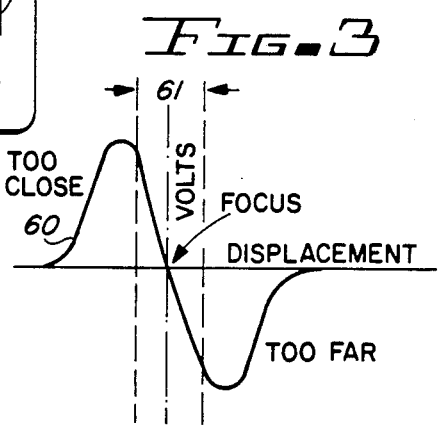

OPTICAL FOCUS DETECTION EMPLOYING ROTATED INTERFERENCE PATTERNS

FIELD OF THE INVENTION

The present invention relates to optical apparatus, particularly to those optical apparatus employing focus detection.

BACKGROUND OF THE INVENTION

Optical data storage systems usually employ a rotating optical disk accessed for recording and sensing by a light beam as it scans either a spiral or concentric track on the rotating disk. Usually, a laser or monochromatic light source supplies collimated light through a lense system which focusses the collimated light onto the disk. The disk reflects light through a lense system to a beam splitter. The beam splitter directs a portion of the reflected light beam onto a focus detecting apparatus which in turn indicates the degree and direction of focus error. The focus error is responded to by a focussing adjustment circuit and focussing lense moving actuator, all such as shown in U.S. Pat. No. 4,381,557.

Those optical data storage devices for storing digital computer data, for example, require a rapid and precise focussing system. Further, the focussing system should be designed to minimize construction and maintenance costs.

Focussing has been a critical area of optical recorders for many years. One of the problems with focus detectors is path length dependency, that is the fidelity of focus indication is subject to the preciseness of the path lengths between the splitter and the detector. It is, therefore, an object of the present invention to provide a focussing system in an optical apparatus which removes path length dependencies from the focus indication.

Apparatus effecting rotated light patterns are rotary shear interferometers, such as shown by Lohmann in U.S. Pat. No. 3,345,912. This patent shows a lateral shear interferometer for examining lense systems. Such a usage does not relate to a focus control system. Interference light patterns caused by lateral shear interferometers are described by Wyant and Smith in an article entitled "Interferometer for measuring power distribution of ophthalmic lenses", Applied Optics, July 1975, Vol. 14. No. 7, pages 1607–1612. This article illustrates a typical light and dark interference pattern found with lateral shear interferometers. Malacara in *Optical Shop Testing*, John Wiley & Sons, New York, 1978, page 105, describes the rotation of light interference patterns. Other mechanisms for rotating patterns can also be used.

Various types of detectors have been employed in optical devices. One type known is shown by Holle et al, U.S. Pat. No. 4,195,909, in FIG. 4 which is a so-called quadrant detector. Four photodetectors are arranged in a rectangular array and coupled to analyzing electronic circuits for measuring the relative light intensities impinging upon the respective detectors. In one sense, the quadrant detector is similar to an electrical bridge detector. Such quadrant detectors have been used for detecting the focussing of an optical system where a spatial frequency filter is employed with respect to a grating system. Such a detector is path length dependent; hence, is expensive to construct and maintain.

With all of the above cited references, optical recorders have not yet had a suitable path length independent focussing detection control apparatus and method.

It is therefore an object of the invention to provide a path length independent focussing system for an optical data recorder which reliably and inexpensively can indicate and control focussing of a light beam impinging upon an optical data record in the submicrometer range.

SUMMARY OF THE INVENTION

The present invention is preferably practiced in an optical data storage device having an optical record medium with data storage location, means for addressably moving a light beam to the data storage locations for recording data onto and sensing data recorded on the record medium. A light path couples a light source to the optical record medium.

Polarization means are interposed in the light path for permitting a light beam having a first rotational polarization received from the light source to pass toward the record medium and to block and deflect any light beam reflected from the record medium. The deflected light beam is intercepted by a light-dark pattern generating means for indicating the focal status of the light beam impinging upon the optical record member. When the intercepted deflected light beam results in a first rotational orientation of light-dark pattern focus is indicated, otherwise nonfocus is indicated by respective second and third rotational orientations of the light-dark pattern. Means are connected to the rotation sensing means and to the focussing means for responding to the nonfocus indicating signals to readjust the focus of the light beam impinging upon the optical record member.

In a specific form of the invention, a polarization means is disposed in the lense system along the light path which redirects the reflected light beam to a light-dark pattern generator, such as a lateral shear interferometer element for generating a light-dark pattern indicative of focal status of the light at the record member surface. The interference pattern is intercepted by quadrant detectors and arranged such that the light pattern impinging upon the quadrant detector when in-focus impinges upon those detectors aligned along diagonals of the quadrants to be equal and to respectively provide more light to detectors along the crossing diagonals respectively for too near or too far displacement of the record medium from the focussing lens.

Circuit means are connected to the quadrant detectors for analyzing the interference light patterns and for controlling the focussing means for adjusting the focus of the light beam impinging on the record member in an accurate and dynamic manner.

The foregoing and other objects, features and advantages of the invention will be apparent from the following more particular description of preferred embodiments of the invention, as illustrated in the accompanying drawings.

BRIEF DESCRIPTION OF THE DRAWING

FIG. 1 is a diagrammatic illustration of an optical data storage device employing the present invention.

FIG. 1A is an enlarged showing of a detector for the FIG. 1 illustrated system which employs the present invention.

FIG. 2, including A–D, illustrates the light patterns on a quadrant detector of the FIG. 1 illustrated device for showing focus and nonocus light beam conditions.

FIG. 3 illustrates the response of the FIG. 1 illustrated quadrant detector to in-focus and out of focus conditions.

FIG. 4, including A-D, is an abbreviated circuit diagram showing a focus detection circuit of the FIG. 1 illustrated device.

DETAILED DESCRIPTION

Referring now to the drawings, like numbers indicate like parts and structural features in the various diagrams. An optical data recorder includes optical record member 10, herein shown as an optical data storage disk supported and rotated by motor 11 in the direction of the arrow 12 about an axis of rotation 13. Doubleheaded arrow 15 indicates the radial band for recording data in disk 10. All of the cord tracks (not shown) on disk 10 reside within radial area 15. It is preferred that such tracks are concentric tracks, however a single spiral track may be employed as well. The radial scanning of the various tracks on disk 10 is achieved by an actuator 20, mounted on device 10 frame 19 (along with motor 11), to radially move head arm 21 via connector rod 22. Head arm 21 is shown in greatly enlarged proportion to disk 10 and actuator 20 for the purpose of illustrating its internal optical components. Arm 21 is suitably mounted on frame 19 for reciprocating motion radially of rotating disk 10.

The optical components in arm 21 include a collimating monochromatic light source 23 having a laser and a collimator supplying a collimated beam of light 30 to optical apparatus 24. Aparatus 24 includes an optical splitter 31 mounted on head arm 21 with a detector 35 in a minimal space. This minimal space mounting is achieved through practicing the present invention. The incident light beam 30 passes through splitter 31 to output light path 32 reaching focusser and light beam bender 25. From focusser 25, light beam 33 impinges upon recording area 15 of optical disk 10. Disk 10 reflects the incident beam 33 to beam binder and focusser 25 which directs the reflected beam over path 34 to splitter 31. Splitter 31 deflects the reflected beam to detector 35, as will become more apparent. Detector 35 detects the focus and supplies a focus indicating signal to electrical circuits 26. Informational detection apparatus 38, 38D, are also employed with splitter 31, as shown in FIG. 1A.

Electrical circuits 26 represent all of the electronic circuits in an optical data recorder. For example, circuits 26 are connected to a host processor via a control unit (not shown), for example, as indicated by line 26H. Line 26A indicates the control that electrical circuits 26 normally exercise over actuator 20 for precisely radially positioning beam 33 to an addressed one of a plurality of concentric record tracks. Similarly, the detected focus signal supplied over line 26D by detector 35 actuates electrical circuits 26 to supply a focus-causing signal over line 26F for adjusting the focus of beam 33, as is well known in the art. Electrical circuits 26 also control motor 11 as indicated by line 26M.

The details of apparatus 24 are shown in FIG. 1A. Splitter 31 includes a splitter element 36 of known design having a polarization coating 36A facing light paths 32 and 34. Reflected light traveling over light path 34 is deflected by splitter element 36 to focal light pattern generator or lateral shear interferometric element 37. Most of the deflected light is transmitted through element 37 onto known detector 38 which supplies electrical signals to data and tracking detector 38D. Detector 38D can be any known detector for effecting data detection and radial tracking of a record track being scanned by beam 33. Lines 26D represent the output of the tracking and data to electrical circuits 26 which further process the signals in known manner.

Some of the deflected light coming into element 37 enters the element to produce interference patterns of light and shadows indicative of the the focal condition of the light in beam 33 as it impinges on record member 10. The later described light-dark or interference pattern, represented generally by numeral 39, travels orthogonally of the deflected light to quadrant detector 40 for enabling detection of the focal condition of the light at record member 10 recording surface 15. In a practical embodiment, elements 36, 37 and 40 are in a unitary structure as follows. Element 37 is a trapezoidal solid optical or glass member having a short dimension 37S and a long dimension 37L for creating two outwardly facing trapezoidal surfaces 37T; all other outer sfaces of element 37 are rectangular. The element 37 has a trapezoidal center line 37C respectively dissecting the trapezoidal surfaces 37T and extending between the two parallel edges of the surfaces 37T. In the abovementioned unitary structure, the element 37 center line 37C extends parallel to edge 36B of splitter element 36. Quadrant detector 40 faces element 37 in a plane orthogonal to the direction of propagation of light-dark patterns 39 and abuts element 37 in the unitary assembly. The drawing shows element 40 skewed for illustrating the four detection elements A, B, C, and D. The elements 36 and 37 consist of optical glass. Element 37 generates the light-dark patterns as described by Maiacara, supra.

Quadrant detector 35 includes rectangular array 40 of four photodetectors, preferably abutting as shown, A, B, C and D. Each of the photodetectors in quadrant array 40 have electrical connections to the detection circuits 41 for respectively supplying electrical indications of the intercepted incident light intensities at the respective detectors. Detector A is coupled over line 42 to detection circuits 41 while detector B uses line 43, detector C uses line 44 and detector D uses line 45. Detection circuits 41 are connected to electrical circuits 26 via line 26D.

The operation of rectangular array 40 for detecting focus using light-dark interference patterns created by the interferometric element 37 includes indicating focus by a light beam disposed parallel to one of the ordinates array 40. Preferably the shadow areas, or dark lines 46, are aligned with the peripheral edges of the array 40. Inspection of the FIG. 2 "in-focus" illustration shows that the light impinging on the diagonally aligned photodetectors A and C is equal to the light impinging upon the diagonally aligned photodetectors B and D. Therefore, equal output from the two sets of diagonally aligned photodetectors indicates an in-focus condition. The too close out of focus or nonfocus condition shows shadow areas 47 of the rotated interference pattern reducing the light intercepted by diagonal photodetectors A and C. Therefore, when the output summation of photodetectors B and D exceeds the output summation of diagonal photetectors A and C, the nonfocus results from focusser 25 and disk 10 being too close together. The reverse nonfocus condition of focusser 25 and disk 10 being too far apart is represented by the shadow or dark line 48 reducing the amount of incident light reaching diagonal photodetectors B and D. Accordingly, when the summed output signal of diagonal photodetectors A and C exceeds the summed output signal of diagonal photodetectors B and D, nonfocus results from focusser 25 and disk 10 being too far apart. Depth of field is typically in the micrometer range.

The accuracy of the described quadrant detector is illustrated in FIG. 3. Line 60 represents the difference signal output of detection circuits 41 on a line 26D as a function of focus conditions. The in-focus condition relts in zero output voltage amplitude, while for a too close nonfocus condition the output amplitude is relatively positive. For a too far nonfocus condition the output amplitude is relatively negative. Numeral 61 indicates a desired range of focus control for the illustrated optical data recorder. Range 61 is in the micrometer range.

Detection circuits 41 include three differential amplifiers 50, 51 and 52 respectively coupled through lines 42-45 to the photodetectors in array 40. The analog signal on line 26DA represents the difference amplitude of the diagonal detectors B and D output signal subtracted from the output signal of diagonal detectors A and C. This analog signal supplied to a focus controller (not shown) in electrical circuits 26 dynamically maintains focus of beam 33 at the disk 10 recording surface. It should be understood that the connections of the differential amplifiers 50, 51 and 52 can be reversed resulting in a reversal of the phase of line 60 in FIG. 3. Other detection circuits, for example of the digital types, may also be employed to equal advantage. Digital circuits can be substituted for the described analog circuits, as desired.

While the invention has been particularly shown and described with reference to preferred embodiments thereof, it will be understood by those skilled in the art that various changes in form and detail may be made therein without departing from the spirit and scope of the invention.

What is claimed is:

1. An optical data storage device having an optical record storage medium with addressable data storage locations, said optical record storage medium capable of reflecting light impinging on said addressable data storage locations and wherein said reflected light beam has a characteristic indicative of the focus of impinging light beam at said addressable data storage locations, means for generating a light beam having a predetermined frequency, means for addressably moving said light beam to optically access said data storage locations for recording data onto and sensing data from said record storage medium including path means providing a light path for transmitting said light beam from said generating means to said optical record storage medium for impinging said transmitted light beam onto an addressed one of said addressable data storage locations and for carrying a light beam reflected from said optical record storage medium due to receiving said transmitted light beam;

rotational pattern generating means in optical communication with said path means for receiving said reflected light beam to generate in response to said received reflected light beam a light-dark pattern having a dynamically varying rotational orientation indicative of said reflected light beam characteristic; and rotation sensing means in optical communication with said rotational pattern generating means or receiving said dynamically generated light-dark pattern and being responsive to said received light-dark pattern to indicate said impinging light beam being in-focus at said addressed data storage location whenever the rotational orientation of the light-dark pattern is a first rotational orientation and too-close or too-far nonfocus conditions respectively for second and third rotational orientations of said received light-dark pattern.

2. The optical data storage device set forth in claim 1 further including, in combination:

focus means operatively coupled to said addressably moving means for adjusting the focus of said impinging light beam at said optical record medium data storage location and being operatively coupled to said rotation sensing means for receiving and responding to said generated indications for supplying focus adjusting signals to said addressably moving means for actuating the addressably moving means to focus said transmitted light beam at said optical record storage medium.

3. The combination set forth in claim 1, further including:

a quadrant detector in said rotation sensing means and optically coupled to said rotational pattern generating means for receiving said light-dark pattern and having four photodetectors disposed in a rectangular array; and detection circuit means in said rotation sensing means electrically coupled to said quadrant detector for comparing the intensity of said received light-dark pattern beam impinging upon the respective ones of said photodetectors in said quadrant detector and for supplying indications of focus, too close nonfocus and too far nonfocus in accordance with the relative light intensities on the detectors of said quadrant detectors as representing the rotational orientation of said received light-dark pattern.

4. The combination set forth in claim 3, further including:

said quadrant detector having four photodetectors in said rectangular array having two detectors being on respective first and second diagonals of said rectangular array; and said detection circuit means including a first circuit means portion connected to two of said detectors for supplying a first differential signal, a second circuit means portion connected to a second of said detectors for supplying a second differential signal and third circuit means portion connected to said first and second circuit means portion for receiving said differential signals for supplying an output signal indicative of the difference in the analog summation of light impinging upon the two detectors in a first diagonal as subtracted from the analog sum of light impinging upon the detectors in the second diagonal such that equality of light on the detectors in the respective diagonals indicates focus, and excess of light in a first one of said diagonals indicating a too close nonfocus and an excess of light in a second one of said diagonal detectors indicating a too far focus.

5. The combination set forth in claim 4 wherein said rotational pattern generating means and said rotation sensing means are spaced apart independently of any optical focus parameters.

6. The combination set forth in claim 5 wherein said connected means for addressably moving includes a movable member carrying said rotational pattern generating means and said rotation sensing means, said movable member being mounted in said data storage device for reciprocating motions for providing scanning of said light beam along a first dimension of said optical record storage member;

said optical record storage medium having a circular shape and being rotatably mounted in said optical data storage device for rotation in a plane orthogonal to said first dimension such that said first dimension lies on a radius of said rotation; and means for rotating said disk and means for moving said movable member radially of said rotating disk.

7. The combination set forth in claim 6 wherein said rotational pattern generating means and said rotation sensing means are in a unitary assembly within said removable member.

8. An optical device having a collimated light source for emitting a beam of light; a member capable of reflecting the emitted beam of light but with predetermined focus indicating changes; a lense system for transmitting said emitted beam of light to said member and for transmitting said reflected beam of light;

the improvement including an improved focus detector comprising:

a beam splitter disposed in said lense system for passing said emitted light and blocking said reflected beam of light from passing but deflecting said reflected beam of light in a direction away from said lense system;

a pattern generating optical member disposed adjacent to said beam splitter for intercepting said deflected light beam to rotatably generate a light interference pattern having a rotational orientation in accordance with and indicating said predetermined focus indicating changes;

a quadrant detector disposed adjacent to pattern generating optical member for intercepting said light interference patterns, quadrant detector having four quadrant light detectors disposed in a rectangular array so as to intercept said quadrant detectors being arranged into two pairs of diagonal detectors; and circuit means connected to said four quadrant detectors for effectively additively combining signals from the quadrant detectors in said pairs of diagonal detectors and subtractively combining the sums for indicating focus when the sums are equal and nonfocus when the sums are not equal.

9. A method of detecting focus of an essentially monochromatic light beam at a given reflective surface wherein the incident beam impinging upon the reflective surface has a first rotational polarization;

including the steps of:

intercepting the light beam reflected by said reflective surface for creating a light interference pattern; and analyzing the light interference pattern for determining its rotational orientation and in response to said determined rotational orientation indicating an in-focus condition for a first relative rotational orientation, a too close nonfocus condition for a second relative rotational orientation and a too far nonfocus for a third relative rotational orientation.

10. The method set forth in claim 9 further including the steps of:

dividing said interference pattern into four parts wherein the parts are corner sections of a rectangular array with two parts respectively being on first and second cross diagonals of the rectangular array;

comparing the interference pattern impinging upon the corner sections of the first array diagonal with the corner portions of the second diagonal of the array; when the comparison indicates equality of reception of the interference pattern, then indicating focus; when said comparison indicates the light intensity on the corner sections of a first diagonal of said array exceeds that light intensity of the second of the corner section on the second diagonal of said array, then indicating a too near focus, and when the interference pattern impinging on said corner section of said second diagonal of said array has an exceeding that intensity of the interference pattern impinging the corner sections receiving the interference pattern of said first diagonal of said array indicating a too far nonfocus condition.

* * * * *